(12) United States Patent
Ogawa

(10) Patent No.: US 11,050,925 B2
(45) Date of Patent: Jun. 29, 2021

(54) ELECTRONIC DEVICE, CONTROL METHOD FOR ELECTRONIC DEVICE, AND NON-TRANSITORY COMPUTER READABLE MEDIUM

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/457,705

(22) Filed: Jun. 28, 2019

(65) Prior Publication Data

US 2020/0014843 A1    Jan. 9, 2020

(30) Foreign Application Priority Data

Jul. 5, 2018 (JP) .............................. JP2018-128100

(51) Int. Cl.
*H04N 5/232* (2006.01)

(52) U.S. Cl.
CPC ..... *H04N 5/23216* (2013.01); *H04N 5/23238* (2013.01); *H04N 5/23293* (2013.01)

(58) Field of Classification Search
CPC ........... H04N 5/23216; H04N 5/23293; H04N 5/23238; G06F 3/012; G06F 3/0482; G06F 3/0485; G06F 3/04883; G06F 3/0346; G06F 1/1694; G06F 1/163; G06F 1/1626

See application file for complete search history.

(56) References Cited

U.S. PATENT DOCUMENTS

| | | | |
|---|---|---|---|
| 5,990,941 A * | 11/1999 | Jackson | G06T 3/0062 348/207.99 |
| 9,521,328 B2 | 12/2016 | Kim et al. | H04N 5/23293 |
| 2008/0174596 A1 | 7/2008 | Jun | 345/418 |

(Continued)

FOREIGN PATENT DOCUMENTS

| | | |
|---|---|---|
| CN | 104079733 | 10/2014 |
| CN | 104469132 | 3/2015 |

(Continued)

OTHER PUBLICATIONS

Extended European Search Report dated Nov. 5, 2019 in counterpart EP Application 19184378.8.

(Continued)

*Primary Examiner* — Lin Ye
*Assistant Examiner* — John H Morehead, III
(74) *Attorney, Agent, or Firm* — Venable LLP

(57) ABSTRACT

An electronic device includes: a receiving unit configured to receive (i) a first instruction for designating, as a display range, a part of a range of an image that is read out from a storage and sent to an external device, and (ii) a second instruction for sending the image stored in the storage to the external device; a control unit configured to, according to the second instruction, send the stored image and information relating to the display range designated by the first instruction to the external device, and to associate the information with the stored image; and a display control unit configured to, in a case where the information is associated with the stored image, display the display range based on the associated information, wherein the display range designates a part of the range of the stored image for viewing.

17 Claims, 5 Drawing Sheets

(56) References Cited

U.S. PATENT DOCUMENTS

| | | | |
|---|---|---|---|
| 2009/0207246 A1* | 8/2009 | Inami | H04N 7/181 |
| | | | 348/135 |
| 2012/0092348 A1 | 4/2012 | McCutchen | 345/474 |
| 2014/0286668 A1 | 9/2014 | Sugimoto | 399/81 |
| 2014/0300693 A1 | 10/2014 | Hirata et al. | 348/39 |
| 2015/0085171 A1 | 3/2015 | Kim et al. | 348/333.04 |
| 2015/0254871 A1 | 9/2015 | MacMillan et al. | 382/180 |
| 2015/0256808 A1* | 9/2015 | MacMillan | G03B 37/04 |
| | | | 348/43 |
| 2016/0269632 A1* | 9/2016 | Morioka | G06T 3/4038 |
| 2017/0078616 A1* | 3/2017 | Uchiyama | H04N 5/23238 |
| 2017/0148488 A1 | 5/2017 | Li et al. | 27/105 |
| 2017/0180635 A1* | 6/2017 | Hayashi | H04N 7/183 |
| 2017/0316806 A1* | 11/2017 | Warren | G11B 27/031 |
| 2017/0366812 A1* | 12/2017 | Abbas | H04N 13/00 |
| 2018/0184001 A1* | 6/2018 | Yoshida | H04N 1/00 |
| 2018/0270417 A1* | 9/2018 | Suitoh | H04N 5/3572 |
| 2018/0374192 A1* | 12/2018 | Kunkel | G06F 3/14 |

FOREIGN PATENT DOCUMENTS

| | | |
|---|---|---|
| CN | 106941631 | 7/2017 |
| EP | 1944685 | 7/2008 |
| JP | 2017-182548 | 10/2017 |

OTHER PUBLICATIONS

Office Action dated Jan. 26, 2021 in counterpart Chinese Application No. 201910604127.7, together with English translation thereof.

\* cited by examiner

FIG. 4A
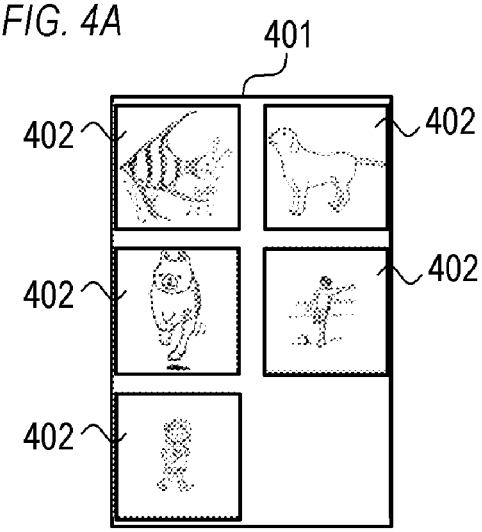
FIG. 4B
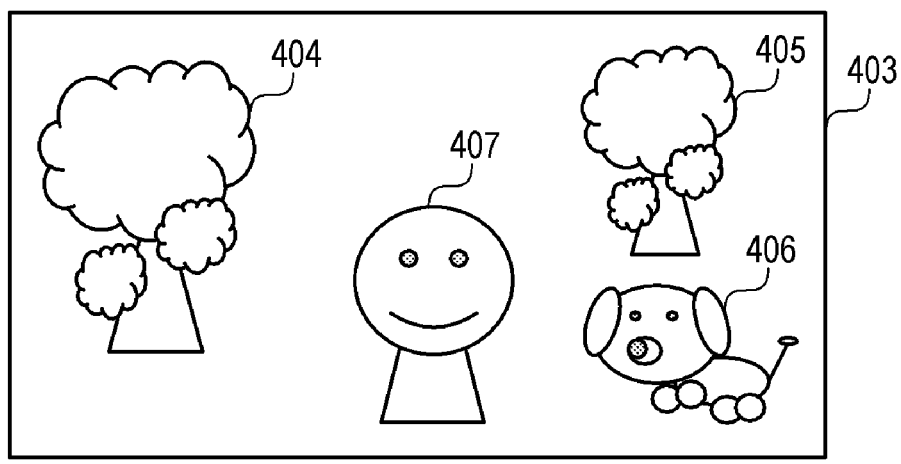
FIG. 4C   FIG. 4D   FIG. 4E
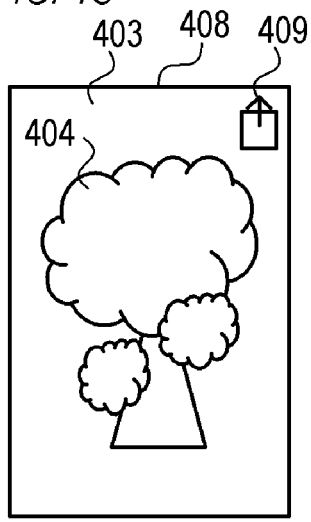 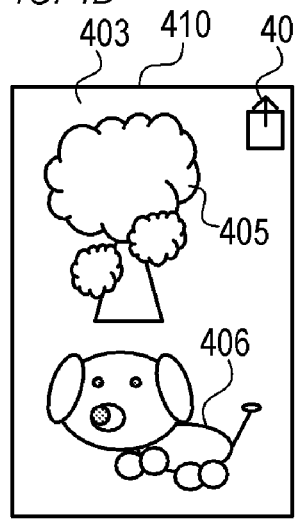 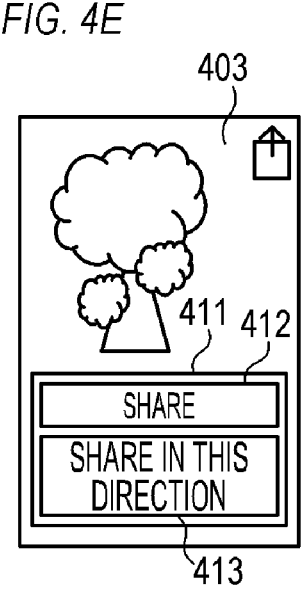

ELECTRONIC DEVICE, CONTROL METHOD FOR ELECTRONIC DEVICE, AND NON-TRANSITORY COMPUTER READABLE MEDIUM

BACKGROUND OF THE INVENTION

Field of the Invention

The present invention relates to an electronic device.

Description of the Related Art

In recent years, imaging devices have been capable of photographing images over a wider viewing angle than normal human vision. For example, such devices are capable of capturing an omnidirectional image and a fully spherical image. Also known is a method of displaying, on a display unit, a part of such a wide viewing angle image and changing, following an orientation change of the device, a range (a display range) of an image displayed on the display unit so as to provide a higher sense of immersion and a higher sense of presence.

Japanese Patent Application Laid-Open No. 2017-182548 discloses a system that stores a spherical image in a server on a network and enables other users to view (share) the spherical image on their own display devices. The system disclosed in Japanese Patent Application Laid-Open No. 2017-182548 enables the other users to view a predetermined region/portion of the spherical image on their own user terminals.

SUMMARY OF THE INVENTION

When a spherical image on a server is displayed, a part of a range of the spherical image is displayed as a display range. That is, for example, a portion of the spherical image showing a part of the viewing range of the spherical image may be displayed. Preferably, a user who sends the spherical image to the server and stores the spherical image may designate, as the display range, a range where the user particularly desires to draw attention (a range of attention) in the spherical image. In this way, it is possible to use the designated range of attention as the display range when displaying the spherical image on the server. It is also possible to share the designated range of attention with other users.

However, when displaying a range of attention of a spherical image on a device (e.g., an own device) that is different to the server, it is necessary to designate the range of attention as the display range.

The present invention provides a technique that enables a device to use the same display range as an external device (e.g. server). In this way, the device and the external device may display an image with the same display range.

The present invention in its first aspect provides an electronic device, comprising at least one memory and at least one processor which function as:

a communication unit configured to communicate with an external device;

a receiving unit configured to receive (i) a first instruction for designating, as a display range, a part of a range of an image that is read out from a storage and sent to the external device, and (ii) a second instruction for sending the image stored in the storage to the external device;

a control unit configured to, according to the second instruction, send the stored image and information relating to the display range designated by the first instruction to the external device, and to associate the information relating to the designated display range with the stored image; and a display control unit configured to, in a case where the information relating to the designated display range is associated with the stored image, display the display range based on the associated information, wherein the display range designates a part of the range of the stored image for viewing.

The present invention in its second aspect provides a control method for an electronic device, the method comprising:

communicating with an external device;

receiving (i) a first instruction for designating, as a display range, a part of a range of an image that is read out from a storage and sent to the external device, and (ii) a second instruction for sending the image stored in the storage to the external device;

sending, according to the second instruction, the stored image and information relating to the display range designated by the first instruction to the external device;

associating the information relating to the designated display range with the stored image; and displaying, in a case where the information relating to the designated display range is associated with the stored image, the display range based on the associated information, wherein the display range designates a part of the range of the stored image for viewing.

The present invention in its third aspect provides a non-transitory computer readable medium that stores a program, wherein the program causes a computer to execute a control method for an electronic device, the method comprising:

communicating with an external device;

receiving (i) a first instruction for designating, as a display range, a part of a range of an image that is read out from a storage and sent to the external device, and (ii) a second instruction for sending the image stored in the storage to the external device;

sending, according to the second instruction, the stored image and information relating to the display range designated by the first instruction to the external device;

associating the information relating to the designated display range with the stored image; and displaying, in a case where the information relating to the designated display range is associated with the stored image, the display range based on the associated information, wherein the display range designates a part of the range of the stored image for viewing.

According to the present invention, when an image on a device different from an external device (e.g. server) is displayed, it is possible to facilitate displaying the same display range as a display range in displaying an image on the external device.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIGS. 4A to 4E are diagrams showing examples of display screens according to the embodiment.

DESCRIPTION OF THE EMBODIMENTS

Figure 1A:
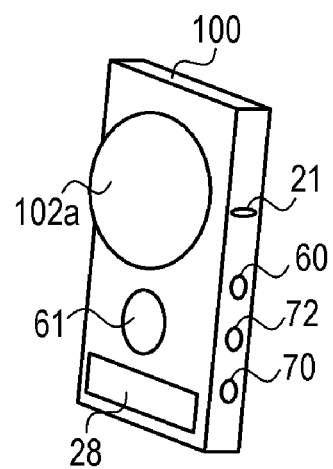
FIGS. 1A and 1B are exterior views of a digital camera according to an embodiment.
Figure 1B:
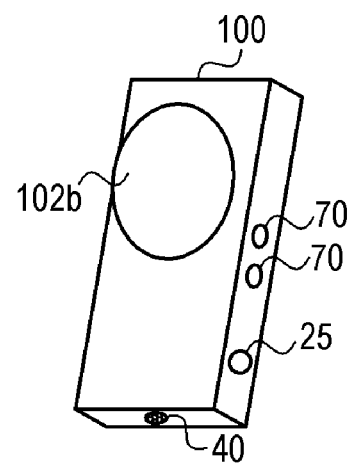

A preferred embodiment of the present invention is explained with reference to the drawings. FIG. 1A is a front perspective view (an exterior view) of a digital camera 100 (an imaging device). FIG. 1B is a rear perspective view (an exterior view) of the digital camera 100. The digital camera 100 is a camera (an omnidirectional camera or a spherical camera) for photographing an omnidirectional image (a spherical image).

A barrier 102a is a protection window for a front camera unit, a photographing range of which is the front of the digital camera 100. The front camera unit is, for example, a wide-angle camera unit, a photographing range of which is a wide range of 180 degrees or more in upward, downward, left, and right directions on the front side of the digital camera 100. A barrier 102b is a protection window for a rear camera unit, a photographing range of which is the rear of the digital camera 100. The rear camera unit is, for example, a wide-angle camera unit, a photographing range of which is a wide range of 180 degree or more in upward, downward, left, and right directions on the rear side of the digital camera 100.

A display unit 28 displays an image and various kinds of information. A shutter button 61 is an operation unit (an operation member) for performing a photographing instruction. A mode changeover switch 60 is an operation unit for switching various modes. A connection I/F 25 is a connector for connecting a connection cable to the digital camera 100. External devices such as a smartphone, a personal computer, and a television device are connected to the digital camera 100 using the connection cable. An operation unit 70 is various switches, buttons, a dial, a touch sensor, or the like that receives various kinds of operation from a user. A power switch 72 is a push button for switching ON/OFF of a power supply.

A light-emitting unit (a light-emitting member) 21 is a light-emitting diode (LED) or the like. The light-emitting unit 21 notifies various states of the digital camera 100 to the user with light emission patterns or light emission colors. A fixing section 40 is, for example, a tripod screw hole. The fixing section 40 is used to fix and set the digital camera 100 with a fixing instrument such as a tripod.

Figure 1C:
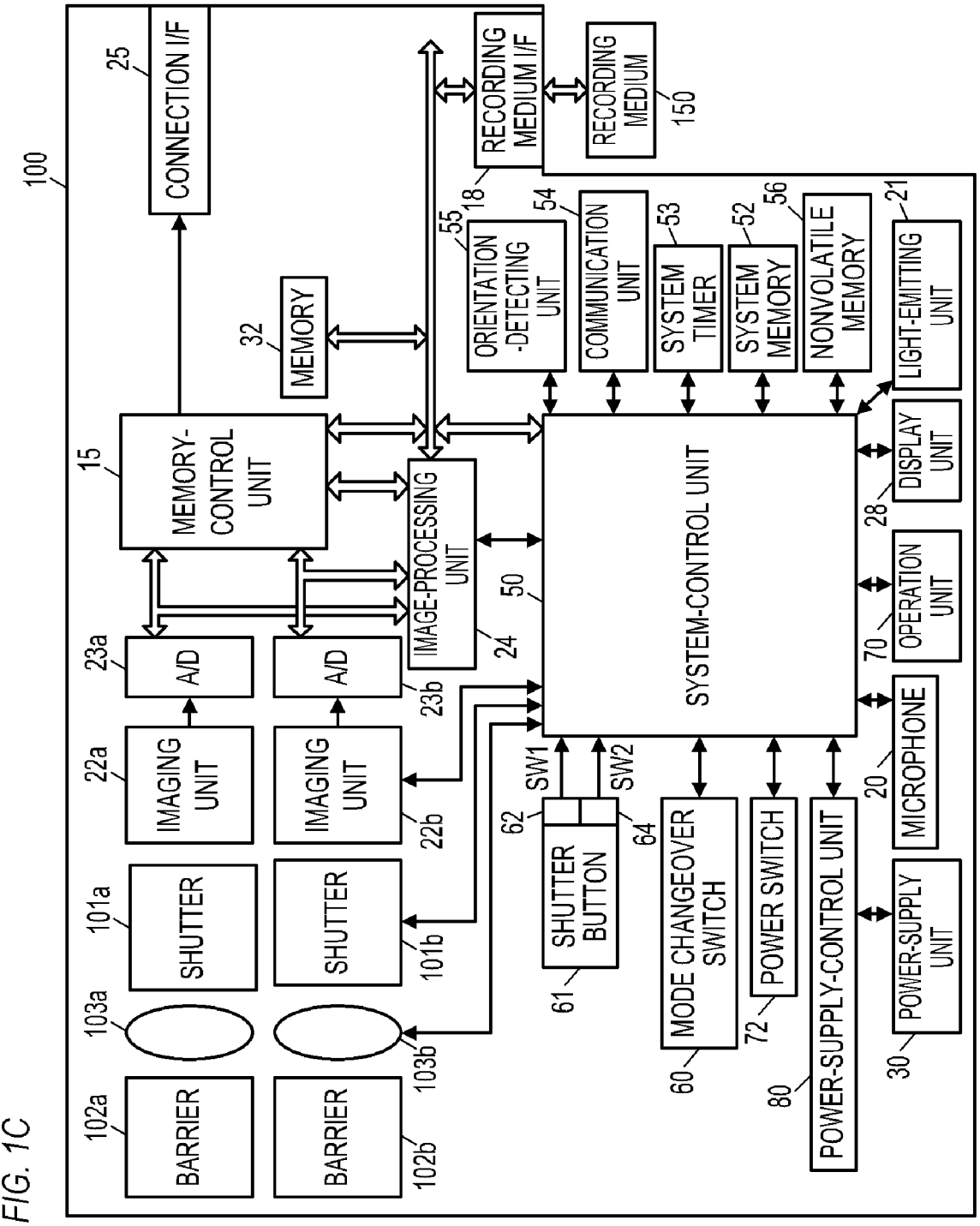
FIG. 1C is a block diagram of the digital camera according to the embodiment.

FIG. 1C is a block diagram showing a configuration example of the digital camera 100.

The barrier 102a covers imaging systems (a photographing lens 103a, a shutter 101a, an imaging unit 22a, etc.) of the front camera unit to thereby prevent stain and breakage of the imaging systems. The photographing lens 103a is a lens group including a zoom lens and a focus lens and is a wide-angle lens. The shutter 101a is a shutter having an aperture function for adjusting an incident amount of object light on the imaging unit 22a. The imaging unit 22a is an imaging element configured of a CCD, a CMOS element, or the like that converts an optical image into an electric signal. An A/D converter 23a converts an analog signal output from the imaging unit 22a into a digital signal. The barrier 102a may not be provided to expose the outer surface of the photographing lens 103a. Stain and breakage of the other imaging systems (the shutter 101a and the imaging unit 22a) may be prevented by the photographing lens 103a.

The barrier 102b covers photographing systems (a photographing lens 103b, a shutter 101b, an imaging unit 22b, etc.) of the rear camera unit to thereby prevent stain and breakage of the imaging systems. The photographing lens 103b is a lens group including a zoom lens and a focus lens and is a wide-angle lens. The shutter 101b is a shutter having an aperture function for adjusting an incident amount of object light on the imaging unit 22b. The imaging unit 22b is an imaging element configured of a CCD, a CMOS element, or the like that converts an optical image into an electric signal. An A/D converter 23b converts an analog signal output from the imaging unit 22b into a digital signal. The barrier 102b may not be provided to expose the outer surface of the photographing lens 103b. Stain and breakage of the other imaging systems (the shutter 101b and the imaging unit 22b) may be prevented by the photographing lens 103b.

A VR (Virtual Reality) image is captured by the imaging unit 22a and the imaging unit 22b. The VR image is an image that can be VR-displayed. The VR image includes an omnidirectional image (a spherical image) captured by an omnidirectional camera (a spherical camera) and a panorama image having a video range (an effective video range) wider than a display range that can be displayed on a display unit at a time. The VR image includes not only a still image but also a moving image and a live view image (an image acquired from a camera substantially on a real-time basis). The VR image has a video range (an effective video range) for a maximum field of view of 360 degrees in the up-down direction (a vertical angle, an angle from the zenith, an elevation angle, a depression angle, and an altitude angle) and 360 degrees in the left-right direction (a horizontal angle and an azimuth angle).

The VR image includes an image having an angle of view (a visual field range) wider than an angle of view photographable by a normal camera or a video range (an effective video range) wider than the display range that can be displayed on the display unit at a time even if the angle of view or the video range is smaller than 360 degrees in the up-down direction and smaller than 360 degrees in the left-right direction. For example, an image photographed by a spherical imaging camera capable of photographing an object for a field of view (an angle of view) of 360 degrees in the left-right direction (a horizontal angle and an azimuth angle) and a vertical angle of 210 degrees centering on the azimuth is a type of the VR image. For example, an image photographed by a camera capable of photographing an object for a field of view (an angle of view) of 180 degrees in the left-right direction (a horizontal angle and an azimuth angle) and a vertical angle of 180 degrees centering on the horizontal direction is a type of the VR image. That is, an image having a video range for a field of view of 160 degrees (±80 degrees) or more respectively in the up-down direction and the left-right direction and having a video range wider than a range that a human can visually recognize at a time is a type of the VR image.

When the VR image is VR-displayed (displayed in a display mode "VR view"), it is possible to view a seamless omnidirectional video in the left-right direction (the horizontal rotation direction) by changing an orientation of a display device (a display device that displays the VR image) in the left-right rotation direction. In the up-down direction (the vertical rotation direction), it is possible to view a seamless omnidirectional video in a range within ±105 degrees when viewed from right above (the zenith). However, ranges out of the range within ±105 degrees when viewed from right above are blank regions where a video is absent. The VR image is also considered to be "an image, a video range of which is at least a part of a virtual space (a VR space)".

The VR-displaying (the VR view) is a displaying method (a displaying mode) capable of changing a display range in which, in the VR image, a video in a part of a visual field range (a display range; a display region) corresponding to an orientation of the display device is displayed. When the user wears a head mount display (HMD), which is a display device, and views a video, a video in a visual field range corresponding to a direction of the face of the user is displayed. For example, in the VR image, a video at a view angle (an angle of view) centering on 0 degree in the left-right direction (a specific direction, for example, the north) and 90 degrees in the up-down direction (90 degrees from the zenith, that is, a level) is displayed at a certain point in time. When the orientation of the display device is reversed (e.g., a display surface is changed from the south to the north), in the same VR image, the display range is changed to a video at a view angle centering on 180 degrees in the left-right direction (the opposite direction, for example, the south) and 90 degrees in the up-down direction (a level). When the user is viewing the HMD, if the user turns the face from the north to the south (i.e., turns back), a video displayed on the HMD is changed from a video of the north to a video of the south. With such VR-displaying, it is possible to visually provide the user with a feeling as if the user is present in the place in the VR image (in a VR space). A smartphone attached to a VR goggle (a head mount adapter) is considered to be a type of the HMD.

A displaying method for the VR image is not limited to the displaying method explained above. The displaying range may be moved (scrolled) according to user operation on the touch panel, a direction button, or the like rather than the orientation change. During VR-displaying (during the VR view mode), both of processing for changing the display range according to the orientation change and processing for changing the display range according to touch-move operation on the touch panel or drag operation on an operation member such as a mouse may be performed.

An image-processing unit 24 performs predetermined processing (resize processing such as pixel interpolation or reduction, color conversion processing, etc.) on data received from the A/D converter 23a and the A/D converter 23b or data received from a memory-control unit 15. The image-processing unit 24 performs predetermined arithmetic processing using captured image data. A system-control unit 50 performs exposure control and range finding control based on an arithmetic operation result obtained by the image-processing unit 24. Consequently, AF (autofocus) processing, AE (automatic exposure) processing, EF (flash pre-light emission) processing, or the like of a TTL (through the lens) scheme is performed. The image-processing unit 24 further performs predetermined arithmetic processing using the captured image data and performs AWB (auto white balance) processing of the TTL scheme based on an obtained arithmetic operation result. The image-processing unit 24 applies basic image processing to two images (fish-eye images) obtained by the A/D converter 23a and the A/D converter 23b and performs joined image processing for combining the two images, to which the basic image processing is applied, to generate a single VR image. During VR-displaying in live view or during reproduction, the image-processing unit 24 performs image segmentation processing, enlargement processing, distortion correction, or the like for VR-displaying the VR image and performs rendering for drawing a processing result in a predetermined storage region in a memory 32.

In the joined image processing, the image-processing unit 24 calculates, using one of the two images as a reference image and using the other as a comparative image, a shift amount between the reference image and the comparative image for each area with pattern matching processing and detects, based on the shift amount for each area, a joining position for joining the two images. The image-processing unit 24 corrects distortions of the images with geometric conversion considering the detected joining position and lens characteristics of the optical systems. Consequently, the images are converted into images of a spherical imaging type. The image-processing unit 24 combines (blends) the two images of the spherical imaging type to generate one spherical image (a VR image). The generated spherical image is an image obtained by using, for example, equirectangular projection. Positions of pixels of the spherical image can be associated with coordinates of the surface of a sphere (a VR space).

Output data from the A/D converters 23a and 23b are written in the memory 32 via the image-processing unit 24 and the memory-control unit 15 or via the memory-control unit 15. The memory 32 stores image data obtained by the imaging units 22a and 22b and converted into digital data by the A/D converters 23a and 23b and image data to be output from the connection I/F 25 to an external display device. The memory 32 has a storage capacity sufficient for storing a predetermined number of still images and a moving image and sound for a predetermined time.

The memory 32 also functions as a memory for image display (a video memory). Data for image display stored in the memory 32 can be output from the connection I/F 25 to the external display. VR images captured by the imaging units 22a and 22b, generated by the image-processing unit 24, and accumulated in the memory 32 are sequentially transferred to and displayed on the external display. Consequently, a function of an electronic viewfinder can be realized and live view-displaying (LV-displaying) can be realized. In the following explanation, an image displayed by the live view display is referred to as live view image (LV image). Similarly, the live view-displaying (remote LV-displaying) can also be realized by sequentially transferring the VR images accumulated in the memory 32 to an external device (a smartphone, etc.) wirelessly connected via a communication unit 54 and displaying the VR images.

A nonvolatile memory 56 is a memory functioning as an electrically erasable recordable recording medium. For example, the nonvolatile memory 56 is an EEPROM. Constants, programs, and the like for the operation of the system-control unit 50 are recorded in the nonvolatile memory 56. The programs refer to computer programs for executing various flowcharts explained below in this embodiment.

The system-control unit 50 is a control unit including at least one processor or circuit and controls the entire digital camera 100. The system-control unit 50 executes the programs recorded in the nonvolatile memory 56 explained above to realize respective kinds of processing in this embodiment explained below. A system memory 52 is, for example, a RAM. The constants and variables for the operation of the system-control unit 50, the programs read out from the nonvolatile memory 56, and the like are developed in the system memory 52. The system-control unit 50 controls the memory 32, the image-processing unit 24, the memory-control unit 15, and the like to thereby perform display control as well. A system timer 53 is a clocking unit that measures times used for various kinds of control and measures a time of an incorporated clock.

The mode changeover switch 60, the shutter button 61, the operation unit 70, and the power switch 72 are used to input various operation instructions to the system-control unit 50.

The mode changeover switch 60 switches the operation mode of the system-control unit 50 to any one of a still image recording mode, a moving image photographing mode, a reproduction mode, a communication connection mode, and the like. As modes included in the still image recording mode, there are an auto photographing mode, an auto scene discrimination mode, a manual mode, an aperture preferential mode (an Av mode), a shutter speed preferential mode (a Tv mode), and a program AE mode (a P mode). There are various scene modes, which are photographing settings for each of photographing scenes, a custom mode, and the like. The user can directly switch the operation mode to any one of these modes with the mode changeover switch 60. Alternatively, the mode changeover switch 60 may be configured to once display a list screen of photographing modes and thereafter, to selectively switch the operation mode to any one of a plurality of modes in the list screen displayed on the display unit 28 using other operation members. Similarly, a plurality of modes may be included in the moving image photographing mode.

The shutter button 61 includes a first shutter switch 62 and a second shutter switch 64. The first shutter switch 62 is turned ON halfway in operation, that is, by so-called half press (a photographing preparation instruction) of the shutter button 61 and generates a first shutter switch signal SW1. The system-control unit 50 starts a photographing preparation operation such as the AF (autofocus) processing, the AE (automatic exposure) processing, the AWB (auto white balance) processing, or the EF (flash pre-light emission) processing according to the first shutter switch signal SW1. A second shutter switch 64 is turned ON at completion of operation, that is, by so-called full press (a photographing instruction) of the shutter button 61 and generates a second shutter switch signal SW2. The system-control unit 50 starts a series of photographing processing operation from signal readout from the imaging units 22a and 22b to writing of image data in a recording medium 150 according to the second shutter switch signal SW2.

The shutter button 61 is not limited to an operation member with which operation in two stages of the full press and the half press is possible and may be an operation member with which only pressing in one stage is possible. In that case, the photographing preparation operation and the photographing processing are continuously performed according to the pressing in one stage. This is the same operation as operation performed when a shutter button that can be half-pressed and full-pressed is full-pressed (operation performed when first shutter switch signal SW1 and the second shutter switch signal SW2 are substantially simultaneously generated).

Functions are allocated to the operation unit 70 for each of scenes as appropriate by selecting and operating various function icons and choices displayed on the display unit 28. The operation unit 70 acts as various function buttons. As the function buttons, there are, for example, an end button, a return button, an image feed button, a jump button, a narrow-down button, an attribute change button, and an INFO button. For example, when a menu button is pressed, various settable menu screens are displayed on the display unit 28. The user can intuitively perform various settings by operating the operation unit 70 while viewing a menu screen displayed on the display unit 28.

The power switch 72 is a push button for switching ON/OFF of a power supply. A power-supply-control unit 80 is configured of a battery detection circuit, a DC-DC converter, a switch circuit that switches a block to be energized, and the like. The power-supply-control unit 80 performs detection of presence or absence of mounting of a battery, a type of the battery, and battery residual power. The power-supply-control unit 80 controls the DC-DC converter based on a result of the detection and an instruction of the system-control unit 50 and supplies a necessary voltage to units including the recording medium 150 for a necessary period. A power-supply unit 30 is configured of a primary battery such as an alkali battery or a lithium battery, a secondary battery such as a NiCd battery, a NiMH battery, or a Li battery, an AC adapter, and the like.

A recording medium I/F 18 is an interface with the recording medium 150 such as a memory card or a hard disk. The recording medium 150 is a recording medium such as a memory card for recording a photographed image. The recording medium 150 is configured of a semiconductor memory, an optical disk, a magnetic disk, or the like. The recording medium 150 may be a replaceable recording medium detachably attachable to the digital camera 100 or may be a recording medium incorporated in the digital camera 100.

The communication unit 54 sends or receives a video signal, a sound signal, and the like to or from an external device connected by radio or a wired cable. The communication unit 54 is connectable to a wireless LAN (Local Area Network) and the Internet. The communication unit 54 can establish a communication with an external device (a server, etc.) on a network via the network. The communication unit 54 can establish a communication with the external device through Bluetooth (registered trademark) and Bluetooth Low Energy as well. The communication unit 54 can send images (including LV images) captured by the imaging units 22a and 22b and images recorded in the recording medium 150. The communication unit 54 can receive images and other various kinds of information from the external device.

An orientation-detecting unit 55 detects an orientation of the digital camera 100 with respect to the gravity direction. The system-control unit 50 can discriminate, based on the orientation detected by the orientation-detecting unit 55, whether images photographed by the imaging units 22a and 22b are images photographed by horizontally holding the digital camera 100 or images photographed by vertically holding the digital camera 100. The system-control unit 50 can discriminate the rotation direction such as a yaw direction, a pitch direction, and roll direction as the tilted direction of the digital camera 100 when the digital camera 100 photographs the images photographed by the imaging units 22a and 22b and can also discriminate the amount of the tilt. The system-control unit 50 can add direction information corresponding to the orientation detected by the orientation-detecting unit 55 to an image file of VR images captured by the imaging units 22a and 22b and rotating an image (adjusting a direction of the image to correct a tilt) and recording the image. As the orientation-detecting unit 55, a single sensor or a combination of two or more sensors among a plurality of sensors such as an acceleration sensor, a gyro sensor, a terrestrial magnetism sensor, an azimuth sensor, an altitude sensor, and the like may be used. The orientation-detecting unit 55 can also detect a motion (pan, tilt, lift, standstill or not, and the like) of the digital camera 100 using the acceleration sensor, the gyro sensor, the azimuth sensor, and the like configuring the orientation-detecting unit 55.

A microphone 20 collects sound around the digital camera 100 recorded as sound of a VR image (a VR moving image), which is a moving image. The connection I/F 25 is a connection plug to which an HDMI (registered trademark) cable, a USB cable, or the like for connecting the digital camera 100 to the external device to send or to receive a video.

Figure 2A:
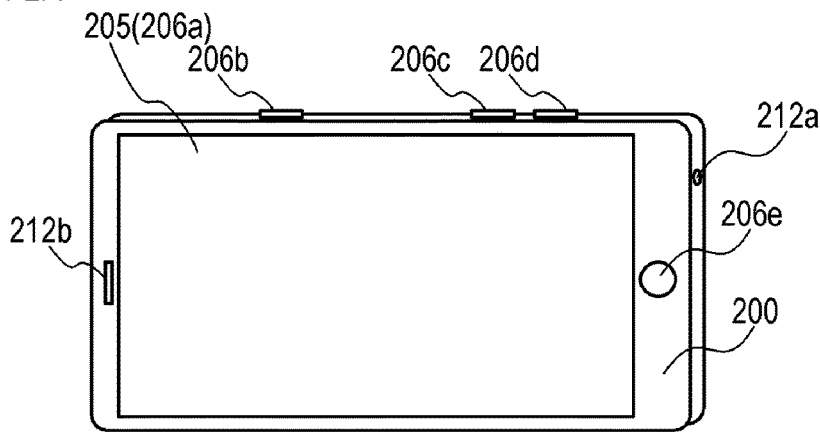
FIG. 2A is an exterior view of a display device according to the embodiment.

FIG. 2A is an exterior view of a display device 200, which is an example of the electronic device according to this embodiment. The display device 200 can be configured using a smartphone or the like. When photographing of an image is instructed by the user, the digital camera 100 explained above generates a spherical image and records an image file including image data of the spherical image in the recording medium 150. The system-control unit 50 generates additional information including information (direction information) for designating a direction pointing a position serving as a center of a display range when the recorded spherical image is displayed (a direction toward the center of the display range from the center of a VR space formed by the spherical image). The system-control unit 50 records the additional information in the recording medium 150 as metadata of the image file. For example, the system-control unit 50 detects a direction of the digital camera 100 during the photographing of the spherical image using various sensors and generates direction information based on a result of the detection. Specifically, the system-control unit 50 generates, as the direction information, information indicating a position where an azimuth angle coincides with an optical axis of one of the front camera unit and the rear camera unit (e.g., the front camera unit) and an elevation angle is an angle in the horizontal direction. The display device 200 determines a display range during a display start of the spherical image based on the direction information included in the additional information.

A display unit 205 displays an image and various kinds of information. The display unit 205 is configured integrally with a touch panel 206a and can detect touch operation on a display surface of the display unit 205. The display device 200 can VR-display a VR image (VR content), which is generated by the digital camera 100 or the like, on the display unit 205. An operation unit 206b is a power button that receives operation for switching ON and OFF of a power supply of the display device 200. Operation units 206c and 206d are volume buttons for increasing and reducing volume of sound output from a sound-output unit 212. An operation unit 206e is a home button for causing the display unit 205 to display a home screen. A sound output terminal 212a is an earphone jack and is a terminal for outputting a sound signal to an earphone, an external speaker, and the like. A speaker 212b is a main body-incorporated speaker that emits sound.

Figure 2B:
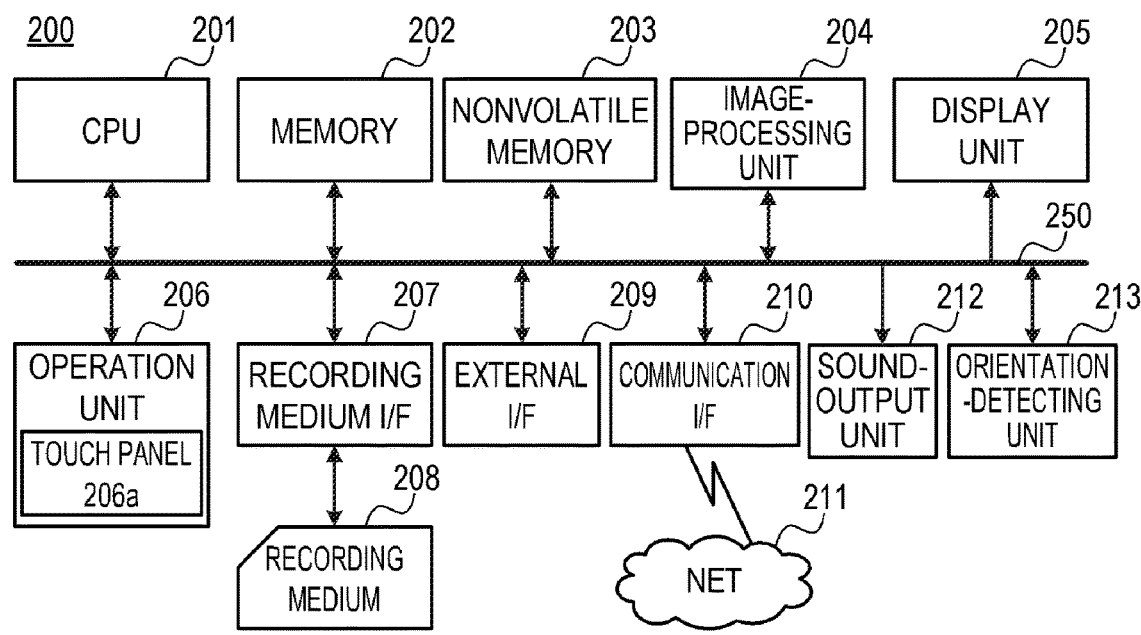
FIG. 2B is a block diagram of the display device according to the embodiment.

FIG. 2B is a block diagram showing a configuration example of the display device 200. A CPU 201, a memory 202, a nonvolatile memory 203, an image-processing unit 204, the display unit 205, an operation unit 206, a recording medium I/F 207, an external I/F 209, and a communication I/F 210 are connected to an internal bus 250. The sound-output unit 212 and an orientation-detecting unit 213 are also connected to the internal bus 250. The units connected to the internal bus 250 are enabled to exchange data with one another via the internal bus 250.

The CPU 201 is a control unit that controls the entire display device 200 and is configured of at least one processor or circuit. The memory 202 is configured of, for example, a RAM (a volatile memory in which a semiconductor element is used, or the like). The CPU 201 controls, according to, for example, programs stored in the nonvolatile memory 203, the units of the display device 200 using the memory 202 as a work memory. Image data and sound data, other data, various programs for the CPU 201 to operate, and the like are stored in the nonvolatile memory 203. The nonvolatile memory 203 is configured of, for example, a flash memory or a ROM.

The image-processing unit 204 applies, based on the control by the CPU 201, various kinds of image processing to images stored in the nonvolatile memory 203 and a recording medium 208, an image signal acquired via the external I/F 209, an image acquired via the communication I/F 210, and the like. The image processing performed by the image-processing unit 204 includes A/D conversion processing, D/A conversion processing, and encoding processing, compression processing, decode processing, enlargement/reduction processing (resize), noise reduction processing, and color conversion processing for image data. The image-processing unit 204 also performs various kinds of image processing such as panoramic development, mapping processing, and conversion of an omnidirectional image or a VR image, which is a wide range image having data in a wide range, although not omnidirectional. The image-processing unit 204 may be configured of a dedicated circuit block for applying specific image processing. Depending on a type of image processing, the CPU 201 can apply the image processing according to a program without using the image-processing unit 204.

The display unit 205 displays, based on the control by the CPU 201, an image, a GUI screen that configures a GUI (Graphical User Interface), or the like. The CPU 201 generates a display control signal according to a program and controls the units of the display device 200 to generate an image signal to be displayed on the display unit 205 and output the image signal to the display unit 205. The display unit 205 displays an image based on the generated image signal. A component included in the electronic device according to this embodiment is at most an interface for outputting an image signal to be displayed on the display unit 205. The display unit 205 may be configured of an external monitor (a television device, an HMD, etc.).

The operation unit 206 is an input device for receiving user operation including a character information input device such as a keyboard, a pointing device such as a mouse or a touch panel, a button, a dial, a joystick, a touch sensor, or a touch pad. In this embodiment, the operation unit 206 includes the touch panel 206a and operation units 206b, 206c, 206d, and 206e.

The recording medium 208 such as a memory card, a CD, or a DVD is detachably attachable to the recording medium I/F 207. The recording medium I/F 207 performs, based on the control by the CPU 201, readout of data from the attached recording medium 208 and writing of data in the recording medium 208. For example, as the recording medium 208, the recording medium 150 in which a spherical image generated by the digital camera 100 is recorded can be attached. In this case, an image signal of a VR image can be read out from the recording medium 208 and displayed on the display unit 205. The external I/F 209 is an interface connected to the external device by a wired cable or radio to perform input and output of a video signal and a sound signal. The communication I/F 210 is an interface for communicating with the external device, the Internet 211, and the like to send or receive various data such as a file and a command.

The sound-output unit 212 outputs sound of a moving image and music data, operation sound, ringtone, various kinds of notification sound, and the like. The sound-output unit 212 includes the sound output terminal 212*a*, to which an earphone or the like is connected, and the speaker 212*b*. However, the sound-output unit 212 may perform sound output through wireless communication or the like.

The orientation-detecting unit 213 detects an orientation of the display device 200 with respect to the gravity direction. The system-control unit 50 can discriminate, based on the orientation detected by the orientation-detecting unit 213, whether the display device 200 is horizontally held, vertically held, directed upward, directed downward, set in an oblique orientation, and the like. The system-control unit 50 can discriminate, for example, presence or absence and magnitude of a tilt of the display device 200 in a rotation direction such as a yaw direction, a pitch direction, or a roll direction or whether the display device 200 rotates in the rotation direction. As the orientation-detecting unit 213, a single sensor or a combination of two or more sensors among a plurality of sensors such as an acceleration sensor, a gyro sensor, a terrestrial magnetism sensor, an azimuth sensor, and an altitude sensor may be used. When the electronic device according to this embodiment is a device separate from the display device (when the display unit 205 is an external monitor), the orientation-detecting unit 213 may be provided in the display device rather than the electronic device.

As explained above, the operation unit 206 includes the touch panel 206*a*. The touch panel 206*a* is an input device planarly configured to be superimposed on the display unit 205 and configured to output coordinate information corresponding to a touched position. The CPU 201 can detect operation on the touch panel 206*a* or states of the touch panel 206*a* explained below.

A finger or a pen not touching the touch panel 206*a* touches the touch panel 206*a* anew, that is, a start of a touch (hereinafter referred to as touch-down).

A state in which the finger or the pen is touching the touch panel 206*a* (hereinafter referred to as touch-on).

The finger or the pen is moving while keeping on touching the touch panel 206*a* (hereinafter referred to as touch-move).

The finger or the pen touching the touch panel 206*a* is separated from the touch panel 206*a*, that is, an end of the touch (hereinafter referred to as touch-up).

A state in which nothing is touching the touch panel 206*a* (hereinafter referred to as touch-off).

When the touch-down is detected, the touch-on is simultaneously detected. After the touch-down, usually, the touch-on is continuously detected unless the touch-up is detected. When the touch-move is detected, the touch-on is simultaneously detected. Even if the touch-on is detected, the touch-move is not detected if a touch position is not moving. When it is detected that all fingers or pens touching the touch panel 206*a* are separated from the touch panel 206*a*, the touch-off is detected.

These operations and states and a position coordinate of the touch of the finger or the pen on the touch panel 206*a* are notified to the CPU 201 through the internal bus 250. The CPU 201 determines, based on the notified information, what kind of operation (touch operation) is performed on the touch panel 206*a*. Concerning the touch-move, a moving direction of the finger or the pen moving on the touch panel 206*a* can also be determined for each of vertical components and horizontal components on the touch panel 206*a* based on a change of the position coordinate. When the touch-move for a predetermined distance or more is detected, the CPU 201 determines that slide operation is performed.

Operation for quickly moving the finger a certain degree of a distance while keeping on touching the touch panel 206*a* and separating the finger from the touch panel 206*a* while moving the finger is called flick. In other words, the flick is operation for quickly tracing on the touch panel 206*a* as if flicking the touch panel 206*a* with the finger. When the touch-move for the predetermined distance or more at predetermined speed or more is detected and the touch-up is detected during the touch-move, the CPU 201 can determine that the flick is performed (determine that the flick is performed following the slide operation).

Further, touch operation for simultaneously touching a plurality of parts (e.g., two points) and bringing touch positions of the plurality of parts close to one another is referred to as pinch-in. Touch operation for moving the touch positions away from one another is referred to as pinch-out. The pinch-out and the pinch-in are collectively referred to as pinch operation (or simply referred to as pinch). As the touch panel 206*a*, a touch panel of any type among various types such as a resistive film type, a capacitance type, a surface acoustic wave type, an infrared type, an electromagnetic induction type, an image recognition type, and an optical sensor type may be used. There are a type for detecting according to contact with a touch panel that the touch panel is touched and a type for detecting according to approach of a finger or a pen to the touch panel that the touch panel is touched. Any one of the types may be used.

Figure 2C:
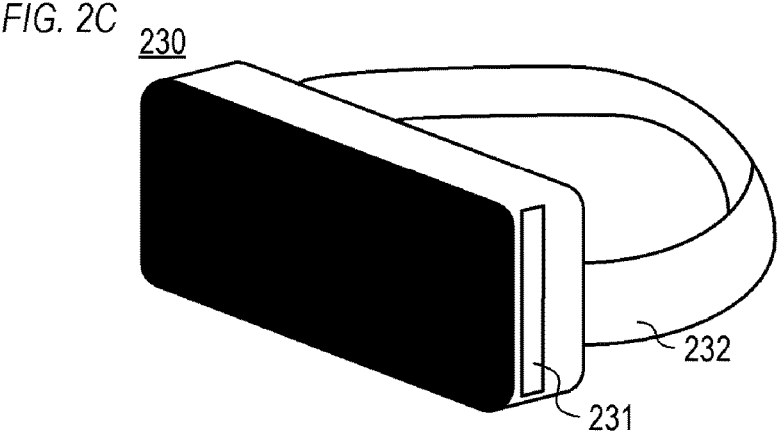
FIG. 2C is an exterior view of a VR goggle according to the embodiment.

FIG. 2C is an exterior view of a VR goggle (a head mount adapter) 230 to which the display device 200 is attachable. The display device 200 can also be used as a head mount display by being attached to the VR goggle 230. An insertion port 231 is an insertion port for inserting the display device 200. The entire display device 200 can be inserted into the VR goggle 230 with the display surface of the display unit 205 directed to the side of a headband 232 for fixing the VR goggle 230 to the head of the user (i.e., the user side). The user can visually recognize the display unit 205 without holding the display device 200 with a hand in a state in which the VR goggle 230 attached with the display device 200 is worn on the head. In this case, when the user moves the head or the entire body, the orientation of the display device 200 also changes. The orientation-detecting unit 213 detects the orientation change of the display device 200 at this time. The CPU 201 performs processing for VR-displaying based on the orientation change. In this case, the orientation-detecting unit 213 detecting the orientation of the display device 200 is equivalent to detecting an orientation of the head of the user (a direction in which the line of sight of the user is directed).

Figure 3A:
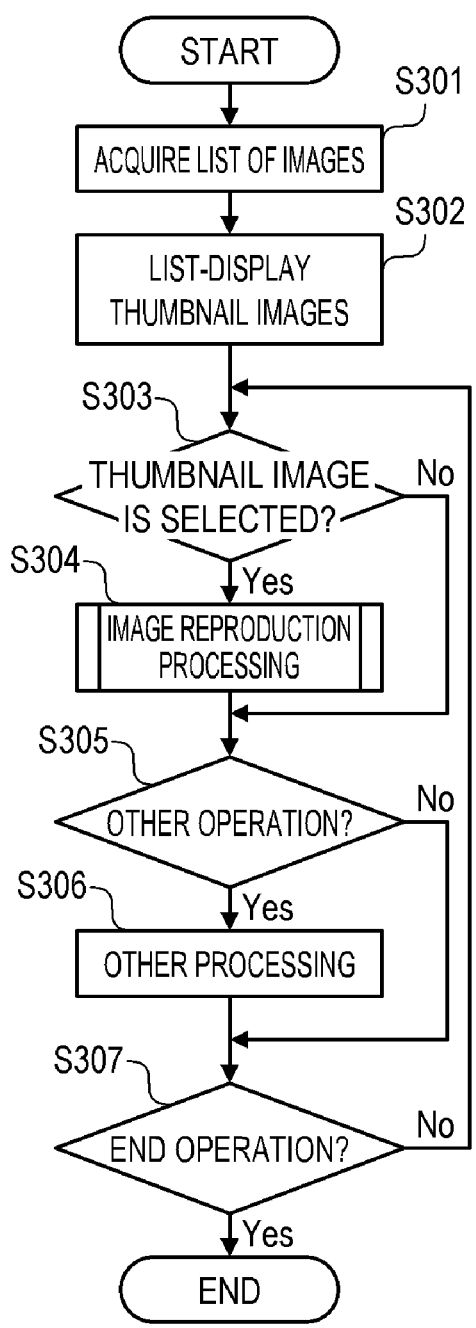
FIGS. 3A and 3B are flowcharts showing processing of the display device according to the embodiment.

FIG. 3A is a flowchart of reproduction related processing including image reproduction processing (explained below) of the display device 200. The reproduction related processing is realized by the CPU 201 loading, in the memory 202, a program (e.g., a specific application program for VR-displaying a VR image recorded in the recording medium 208) recorded in the nonvolatile memory 203 and executing the loaded program. When the power button 206*b* is operated and the power supply of the display device 200 is turned on, the CPU 201 initializes a flag, a control variable, and the like and thereafter starts the reproduction related processing.

The display device 200 has a function of VR-displaying a VR image. When VR-displaying, the display device 200 displays a display range, which is a part of the VR image. The display device 200 has a function of sending an image file of a VR image (a private image) recorded in the recording medium 208 to a server or the like on a network and enabling other users to view the VR image. In the following explanation, the function of sending the VR image to the external device to enable the other users to view the VR image is referred to as sharing function. In the following explanation, the VR image received from the recording medium 208 and displayed on the display device 200 is referred to as private image. An image sent to and saved in the external device such as the server by the sharing function is referred to as shared image in the following explanation.

When using the sharing function of the VR image, the user can designate an external device at a sending destination (a destination) of an image, a display range of the shared VR image (a display direction, which is a direction from the center of a VR space toward the center of the display range), and the like. The display device 200 sends, as metadata, additional information including direction information concerning the designated display range (display direction) to the external device together with the VR image. When another user accesses the VR image (the shared image) on the external device and VR-displays the VR image, a display range corresponding to the sent direction information is displayed during a start VR-displaying.

When the reproduction related processing is started, in step S301, the CPU 201 acquires a list of image data stored in the recording medium 208. Subsequently, in step S302, the CPU 201 instructs, based on the acquired list, the display unit 205 to perform list display of thumbnail images of the image data stored in the recording medium 208. FIG. 4A is a screen example of the list display of the thumbnail images. A plurality of thumbnail images 402 are displayed (disposed) on a list screen 401. Subsequently, in step S303, the CPU 201 determines whether selection operation for selecting a thumbnail image (e.g., any one of a plurality of thumbnail images) is performed on the operation unit 206. When the selection operation is performed, the CPU 201 proceeds to step S304. Otherwise, the CPU 201 proceeds to step S305. In step S304, the CPU 201 performs image reproduction processing for a private image corresponding to the thumbnail image selected according to the selection operation. The image reproduction processing is explained below.

In step S305, the CPU 201 determines whether other operation is performed on the operation unit 206. When operation is performed, the CPU 201 proceeds to step S306. Otherwise, the CPU 201 proceeds to step S307. In step S306, the CPU 201 performs processing (other processing) corresponding to the performed operation. The CPU 201 proceeds to step S307. For example, enlargement, reduction, or the like of the thumbnail image to be displayed is performed according to pinch operation on the touch panel 206a. In step S307, the CPU 201 determines whether end operation (end operation for the reproduction related processing) is performed on the operation unit 206. When the end operation is performed, the CPU 201 ends the reproduction related processing. Otherwise, the CPU 201 returns to step S303.

Figure 3B:
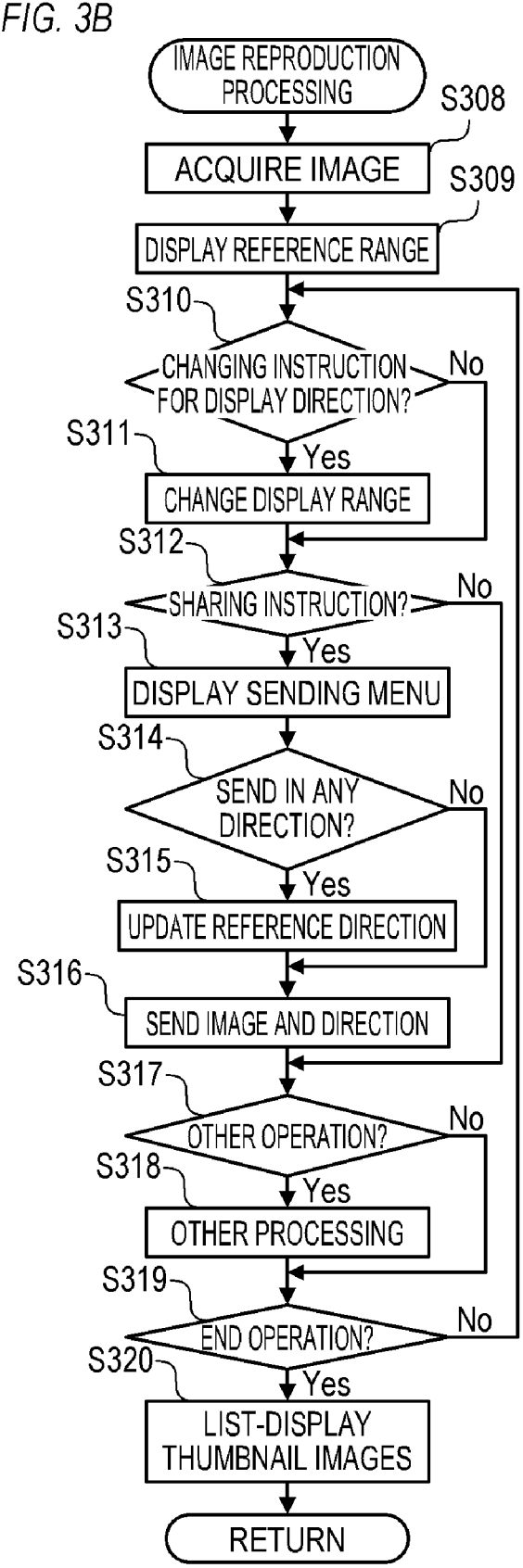

FIG. 3B is a flowchart of the image reproduction processing in step S307. The image reproduction processing is also realized by the CPU 201 loading, in the memory 202, a program recorded in the nonvolatile memory 203 and executing the loaded program.

When the image reproduction processing is started, in step S308, the CPU 201 detects an image file corresponding to the selected thumbnail image (an image file of the private image) and reads out the image file from the recording medium 208. As an example, an image file of a spherical image (a VR image) shown in FIG. 4B is read out. The VR image 403 includes objects 404, 405, 406, and 407.

Subsequently, in step S309, the CPU 201 displays a reference range (a predetermined display range) of the read-out VR image 403 on the display unit 205. Specifically, the CPU 201 extracts direction information (e.g., direction information generated, when the VR image 403 is photographed, by an imaging device or the like and recorded together with the VR image 403) from additional information of the read-out image file. In the following explanation, a direction indicated by the direction information (a direction for the VR-displaying; a displaying direction) is referred to as reference direction. The CPU 201 determines, based on the reference direction, as a display range (a reference range), a range centering on a position indicated by the reference direction and having a size corresponding to a size of the display unit 205 in the read-out VR image 403 and displays an image in the display range on the display unit 205. FIG. 4C is a screen example displayed on the display unit 205 in step S309 when the reference direction points the object 404. On a screen 408, a display range, which is a part of a range of the VR image 403, is displayed such that the object 404 is located in the center. Further, on the screen 408, a sharing button 409 for performing a sharing instruction for sharing the VR image 403 is displayed.

Subsequently, in step S310, the CPU 201 determines whether a changing instruction (changing operation) for changing the display direction of the VR-displaying is performed. The changing instruction is also considered to be "an instruction for designating a part of a range of a private image (the VR image 403 recorded in the recording medium 208) as a display range" or "an instruction for changing the display range". When the changing instruction is performed, the CPU 201 proceeds to step S311. Otherwise, the CPU 201 proceeds to step S312. In step S311, the CPU 201 changes the display direction according to the changing instruction to change the display range displayed on the display unit 205. The CPU 201 proceeds to step S312. FIG. 4D is a screen example displayed on the display unit 205 after the display direction is changed from the state shown in FIG. 4C. On a screen 410, the display range, which is a part of the range of the VR image 403, is displayed such that the objects 405 and 406 are located in the center. The user may perform the changing instruction by performing operation on the operation unit 206 or may perform the changing instruction with other methods. For example, the user may perform the changing instruction by performing touch move operation on the touch panel 206a or may perform the changing instruction by changing the orientation of the display device 200. In this embodiment, when the changing instruction is performed, the CPU 201 stores direction information concerning the display direction after the change.

In step S312, the CPU 201 determines whether a sharing instruction for sending the VR image (the private image) being displayed to the external device as a shared image. In this embodiment, the user can perform the sharing instruction by, for example, touching the touch panel 206a in the same manner as touching the sharing button 409. When the sharing instruction is performed, the CPU 201 proceeds to step S313. Otherwise, the CPU 201 proceeds to step S317. In step S313, the CPU 201 instructs the display unit 205 to display a sending menu screen. FIG. 4E is an example of the sending menu screen. When the user touches the sharing button 409 in the state of FIG. 4C or FIG. 4D, the display screen of the display unit 205 transitions to the screen shown in FIG. 4E. In FIG. 4E, a sending menu screen 411 is displayed to be superimposed on the VR image 403. The sending menu screen 411 includes buttons 412 and 413. The button 412 is a button to instruct sending the direction information concerning the reference direction (the reference range) displayed in step S309. The button 413 is a button to instruct sending the direction information concerning the display direction (the display range) after the change in step S311.

Subsequently, in step S314, the CPU 201 determines whether operation for sending a VR image is performed after any display direction is designated. Specifically, the CPU 201 determines whether operation for selecting the button 413 is performed. When the button 413 is selected, the CPU 201 proceeds to step S315. When the button 412 is selected, the CPU 201 proceeds to step S316. When the sharing instruction is performed, the CPU 201 may omit the processing in steps S313 and S314 and proceed from step S312 to step S315.

In step S315, the CPU 201 associates the direction information concerning the display direction (the display range) being displayed with the VR image (the private image) being displayed. Specifically, the CPU 201 updates the direction information (the direction information concerning the reference direction) included in the image file of the VR image 403 to the direction information concerning the display direction being displayed (a present display direction). That is, the CPU 201 updates the direction information included in the metadata of the image file of the VR image 403 recorded in the recording medium 208 such that the display direction being displayed becomes the reference direction. Consequently, when reproduction of the VR image 403 is instructed again, in step S309, a display range centering on a position indicated by the reference direction after the update is displayed on the display unit 205. The display direction being displayed is, for example, the display direction after the change in step S311. When the processing in step S311 is not performed, the processing in step S315 may be omitted. After step S315, the CPU 201 proceeds to step S316.

In step S316, the CPU 201 sends the VR image being displayed and the direction information concerning the display direction being displayed to the external device using the communication I/F 210. Specifically, the CPU 201 reads out an image file of the VR image being displayed (an image file including the direction information after the update) from the recording medium 208 and sends the image file to the external device. The VR image (the shared image) sent to the external device can be displayed by various display devices via a network. During a display start of the shared image, an image of a reference direction (a reference range) corresponding to the direction information sent to and retained in the external device is displayed. The VR image being displayed and the direction information concerning the display direction being displayed may be separately sent.

Subsequently, in step S317, the CPU 201 determines whether other operation is performed on the operation unit 206. When operation is performed, the CPU 201 proceeds to step S318. Otherwise, the CPU 201 proceeds to step S319. In step S318, the CPU 201 performs processing (other processing) corresponding to the performed operation. The CPU 201 proceeds to step S319. For example, enlargement, reduction, or the like of a VR image to be displayed is performed according to pinch operation on the touch panel 206a. In step S319, the CPU 201 determines whether end operation (end operation for the image reproduction processing) is performed on the operation unit 206. When the end operation is performed, the CPU 201 proceeds to step S320. Otherwise, the CPU 201 returns to step S310. In step S320, the CPU 201 instructs the display unit 205 to perform list display of thumbnail images. Consequently, the display screen of the display unit 205 returns to the list screen of the thumbnail images. The CPU 201 proceeds to step S305 in FIG. 3A.

As explained above, according to this embodiment, when the shared image and the direction information are sent to the external device, the same direction information as the direction information sent to the external device is associated with the private image corresponding to the shared image. Consequently, viewability of the private image is improved. Specifically, when the private image is displayed, it is possible to easily display (without the user performing operation for changing the display range) the same display range as the display range in displaying the shared image.

Processing for associating the designated display direction (display range) with the private image does not have to be the update of the reference direction of the private image. The designated display direction may be additionally associated with the private image without changing the associated reference direction. New direction information concerning the designated display direction may be additionally added to the private image without updating the direction information already added to the private image. When a plurality of display directions are associated with one VR image (private image or shared image), during display of the VR image, any one of the associated plurality of display directions is selected and displayed automatically or according to user operation.

An example is explained above in which one display direction is designated and notified to the external device. However, a plurality of display directions may be designated and notified to the external device. That is, the shared image and direction information concerning the plurality of display directions may be sent to the external device. Concerning each of the plurality of display directions, a combination of direction information concerning the display direction and the shared image may be sent to the external device. One combination of the shared image and the direction information concerning the plurality of display directions may be sent to the external device.

When the plurality of display directions are designated, at least any one of the designated plurality of display directions may be associated with the private image. A designated display direction may not be associated with the private image. A display direction designated at characteristic timing such as first or last timing may be associated with the private image. Consequently, when the plurality of display directions are notified to the external device, improvement of viewability of the private image can be expected.

Information (identification information) capable of identifying a device (a camera, etc.) that generates the private image may be further acquired. The identification information may or may not be included in the metadata of the private image. When the sharing instruction is performed, the CPU 201 may determine, according to the identification information, whether the designated display direction is associated with the private image. For example, the CPU 201 may determine the display direction is associated with only an image photographed by a specific camera. Consequently, it is possible to suppress association of unnecessary information (inappropriate information; unintended information) with an image other than the image photographed by the specific camera.

As an application for using a designated and associated display direction, only a specific application may be assumed. In that case, the designated display direction may be associated with the private image using an information region (a metadata region) used only in the specific application. An information region used in other applications as well may not be edited. The specific application may be an application corresponding to only the image photographed by the specific camera. The information region used only in the specific application may be an information region present only in an image file generated by the specific camera. When an association target information region is absent, a changed display direction may not be associated. Consequently, it is possible to prevent unintended display from being performed by an application other than the specific application and prevent unnecessary information from being associated with an image other than the image photographed by the specific camera.

When the designated display direction is associated with the private image, a predetermined notification (predetermined guidance display, etc.) may be performed. For example, it may be notified to the user that the association is performed. It may be confirmed with the user whether to perform association. When the user instructs to perform the association, the association may be performed. When the user instructs not to perform the association, the association may not be performed. When a difference between the designated display direction and the reference direction is equal to or smaller than a threshold, the designated display direction may not be associated with the private image.

When the private image is included in a photobook (a digital photobook), a duplicate of the private image may be generated according to the sharing instruction. According to the sharing instruction, one of the private image and the duplicate may be associated with the designated display direction and left in the photobook and the other of the private image and the duplicate may be excluded from the photobook without being deleted and without being associated with the designated display direction. Consequently, it is possible to suitably view each of an image left in the photobook and an image excluded from the photobook. Specifically, concerning the image left in the photobook, the same display direction as the direction in displaying the shared image can be easily displayed. Concerning the image excluded from the photobook, it is possible to easily display the reference direction associated during the photographing.

The various kinds of control explained above as the control performed by the CPU 201 may be performed by one piece of hardware. A plurality of pieces of hardware (e.g., a plurality of processors or circuits) may share the processing to perform the control of the entire device.

The present invention is explained in detail above based on the preferred embodiments of the present invention. However, the present invention is not limited to these specific embodiments. Various forms in a range not departing from the gist of the present invention are also included in the present invention. Further, the embodiments explained above only indicate an embodiment of the present invention. The embodiments can also be combined as appropriate.

In the embodiment explained above, an example is explained in which the present invention is applied to the display device. However, the present invention is not limited to this example and is applicable to an electronic device capable of controlling communication between devices. For example, the present invention is applicable to a personal computer, a PDA a cellular phone terminal, a portable image viewer, a printer device, a digital photo frame, a music player, a game machine, an electronic book reader, and a video player. The present invention is also applicable to a television device, a projection device, a tablet terminal, a smartphone, an AI speaker, a household electric device, a vehicle-mounted device, a medical device, and the like.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-128100, filed on Jul. 5, 2018, which is hereby incorporated by reference herein in its entirety.

What is claimed is:

1. An electronic device comprising:
    a processor; and
    a memory storing a program which, when executed by the processor, causes the electronic device to:
    communicate with an external device;
    receive (i) a first instruction for designating, as a display range, a part of a range of an image that is read out from a storage and sent to the external device, and (ii) a second instruction for sending the image stored in the storage to the external device;
    send, according to the second instruction, the stored image and information relating to the display range designated by the first instruction to the external device;
    associate the information relating to the designated display range with the stored image; and
    display, in a case where the information relating to the designated display range is associated with the stored image, the display range based on the associated information, wherein the display range designates a part of the range of the stored image for viewing, wherein in a case where a difference between the designated display range and a predetermined display range is equal to or smaller than a threshold, the information relating to the designated display range is not associated with the stored image even if the second instruction is received.

2. The electronic device according to claim 1, wherein the information relating to the designated display range is associated with the stored image by updating additional information of the stored image.

3. The electronic device according to claim 1, wherein, in a case where the first instruction is not received, the stored image and information relating to a predetermined display range are sent to the external device if the second instruction is received.

4. The electronic device according to claim 1, wherein the predetermined display range is displayed if the information relating to the designated display range is not associated with the stored image and the designated display range is displayed if the information relating to the designated display range is associated with the stored image.

5. The electronic device according to claim 1, wherein, in a case where the first instruction is not received, even if the second instruction is received, it is performed that processing for associating the information relating to the designated display range with the stored image.

6. The electronic device according to claim 1, wherein the program further causes the electronic device to acquire information capable of identifying a device that generates the stored image, and in a case where the second instruction is received, it is determined that whether the information relating to the designated display range is associated with the stored image, according to the information capable of identifying the device that generates the stored image.

7. The electronic device according to claim 1, wherein the information relating to the designated display range is associated with the stored image as information which is to be used by a specific application and not to be used by other applications.

8. The electronic device according to claim 1, wherein, in a case where a plurality of display ranges are designated by the first instruction, the stored image and information relating to the plurality of display ranges are sent to the external device according to the second instruction.

9. The electronic device according to claim 8, wherein, in a case where the plurality of display ranges are designated by the first instruction, information relating to the display range and the stored image are sent to the external device with respect to each of the plurality of display ranges, according to the second instruction.

10. The electronic device according to claim 1, wherein, in a case where a plurality of display ranges are designated by the first instruction, the information relating to the designated display range is not associated with the stored image even if the second instruction is received.

11. The electronic device according to claim 1, wherein the stored image is included in a photobook, the program further causes the electronic device to generate a duplicate of the stored image according to the second instruction, and according to the second instruction, (i) one of the stored image and the duplicate is left in the photobook while associating the one of the stored image and the duplicate with the information relating to the designated display range and (ii) the other of the stored image and the duplicate is removed from the photobook without associating the other of the stored image and the duplicate with the information relating to the designated display range.

12. The electronic device according to claim 1, wherein, in a case where a plurality of display ranges are designated by the first instruction, information relating to any one of the plurality of display ranges is associated with the stored image according to the second instruction.

13. The electronic device according to claim 1, wherein a predetermined notification is performed in associating the information relating to the designated display range with the stored image.

14. The electronic device according to claim 1, wherein an instruction is received for changing a display range of an displayed image, and a display range corresponding to the display range changed according to the changing instruction is designated as the display range, which is a part of the range of the image sent to the external device, according to the first instruction.

15. The electronic device according to claim 1, wherein the image is a spherical image and the image has a video range for a field of view of 360 degrees.

16. A control method for an electronic device, the method comprising:

communicating with an external device;

receiving (i) a first instruction for designating, as a display range, a part of a range of an image that is read out from a storage and sent to the external device, and (ii) a second instruction for sending the image stored in the storage to the external device;

sending, according to the second instruction, the stored image and information relating to the display range designated by the first instruction to the external device;

associating the information relating to the designated display range with the stored image; and displaying, in a case where the information relating to the designated display range is associated with the stored image, the display range based on the associated information, wherein the display range designates a part of the range of the stored image for viewing, wherein in a case where a difference between the designated display range and a predetermined display range is equal to or smaller than a threshold, the information relating to the designated display range is not associated with the stored image even if the second instruction is received.

17. A non-transitory computer readable medium that stores a program, wherein the program causes a computer to execute a control method for an electronic device, the method comprising:

communicating with an external device;

receiving (i) a first instruction for designating, as a display range, a part of a range of an image that is read out from a storage and sent to the external device, and (ii) a second instruction for sending the image stored in the storage to the external device;

sending, according to the second instruction, the stored image and information relating to the display range designated by the first instruction to the external device;

associating the information relating to the designated display range with the stored image; and displaying, in a case where the information relating to the designated display range is associated with the stored image, the display range based on the associated information, wherein the display range designates a part of the range of the stored image for viewing, wherein in a case where a difference between the designated display range and a predetermined display range is equal to or smaller than a threshold, the information relating to the designated display range is not associated with the stored image even if the second instruction is received.

* * * * *